US011952641B2

(12) United States Patent
Takahashi et al.

(10) Patent No.: US 11,952,641 B2
(45) Date of Patent: Apr. 9, 2024

(54) NON ORIENTED ELECTRICAL STEEL SHEET

(71) Applicant: NIPPON STEEL CORPORATION, Tokyo (JP)

(72) Inventors: Masaru Takahashi, Tokyo (JP); Takeru Ichie, Tokyo (JP); Tesshu Murakawa, Tokyo (JP); Shinichi Matsui, Tokyo (JP); Fuminobu Murakami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 294 days.

(21) Appl. No.: 17/437,703

(22) PCT Filed: Mar. 20, 2019

(86) PCT No.: PCT/JP2019/011833

§ 371 (c)(1),
(2) Date: Sep. 9, 2021

(87) PCT Pub. No.: WO2020/188812

PCT Pub. Date: Sep. 24, 2020

(65) Prior Publication Data

US 2022/0154304 A1 May 19, 2022

(51) Int. Cl.

| | |
|---|---|
| ***C22C 38/00*** | (2006.01) |
| ***C21D 6/00*** | (2006.01) |
| ***C21D 8/00*** | (2006.01) |
| ***C21D 8/12*** | (2006.01) |
| ***C21D 9/46*** | (2006.01) |

(Continued)

(52) U.S. Cl.
CPC ............... *C21D 9/46* (2013.01); *C21D 6/005* (2013.01); *C21D 6/008* (2013.01); *C21D 8/005* (2013.01);

(Continued)

(58) Field of Classification Search
CPC ... C22C 38/001; C22C 38/002; C22C 38/005; C22C 38/008; C22C 38/02; C22C 38/04; C22C 38/06; C22C 38/16; C22C 2202/02

(Continued)

(56) References Cited

U.S. PATENT DOCUMENTS

2007/0062611 A1 3/2007 Murakami

FOREIGN PATENT DOCUMENTS

CN 105950960 A 9/2016
JP 2000-226616 A 8/2000

(Continued)

OTHER PUBLICATIONS

Honma et al., (JP 2011168824 A Google Patents machine translation printed Aug. 23, 2023), Sep. 1, 2011, entire translation (Year: 2011).*

(Continued)

*Primary Examiner* — Katherine A Christy
(74) *Attorney, Agent, or Firm* — Birch, Stewart, Kolasch & Birch, LLP

(57) ABSTRACT

A non oriented electrical steel sheet consists of a silicon steel sheet and an insulation coating. The silicon steel sheet includes an internally oxidized layer containing $SiO_2$ in a surface thereof, an average thickness of the internally oxidized layer is 0.10 to 5.0 μm, and a Vickers hardness in the internally oxidized layer is 1.15 to 1.5 times as compared with a Vickers hardness in a thickness central area.

6 Claims, 3 Drawing Sheets

(51) Int. Cl.

| | |
|---|---|
| ***C22C 38/02*** | (2006.01) |
| ***C22C 38/04*** | (2006.01) |
| ***C22C 38/06*** | (2006.01) |
| ***C22C 38/16*** | (2006.01) |
| ***C23G 1/08*** | (2006.01) |
| ***H01F 1/147*** | (2006.01) |

(52) U.S. Cl.

CPC ......... *C21D 8/1222* (2013.01); *C21D 8/1233* (2013.01); *C21D 8/1283* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/16* (2013.01); *C23G 1/08* (2013.01); *H01F 1/147* (2013.01); *C22C 2202/02* (2013.01)

(58) Field of Classification Search

USPC .......................................................... 428/469

See application file for complete search history.

(56) References Cited

FOREIGN PATENT DOCUMENTS

| | | | | |
|---|---|---|---|---|
| JP | 2000-297326 | A | | 10/2000 |
| JP | 2001-172752 | A | | 6/2001 |
| JP | 2001-172753 | A | | 6/2001 |
| JP | 3307897 | B2 | | 7/2002 |
| JP | 2003096548 | A | * | 4/2003 |
| JP | 2008-31490 | A | | 2/2008 |
| JP | 4116748 | B2 | | 7/2008 |
| JP | 4116749 | B2 | | 7/2008 |
| JP | 4160469 | B2 | | 10/2008 |
| JP | 2011168824 | A | * | 9/2011 |
| JP | 5000136 | B2 | | 8/2012 |
| JP | 2013-115899 | A | | 6/2013 |
| JP | 2018-154853 | A | | 10/2018 |

OTHER PUBLICATIONS

Fujimura et al., (JP 2003096548 A Google Patents machine translation printed Aug. 23, 2023), Apr. 3, 2003, entire translation (Year: 2003).*

Nakamura et al., "A Study on Punchability and Weldability of Electrical Steel Sheets with the Insulating Coating", Iron and Steel, vol. 66, No. 7, 1980, pp. 1000-1009.

Takeda et al., "Development of Environmental-Frendly Coating on Electrical Steel Sheets with Excellent Punchability and Interlaminar Resistance", Materia Japan, vol. 50, No. 3, 2011, pp. 126-128.

* cited by examiner

NON ORIENTED ELECTRICAL STEEL SHEET

TECHNICAL FIELD

The present invention relates to a non oriented electrical steel sheet which is mainly used for core materials for electrical equipment and which is excellent in fatigue strength and magnetic characteristics.

BACKGROUND ART

In recent years, in the field of electrical equipment, especially rotating machines, small and medium size transformers, electrical components, and the like in which the non oriented electrical steel sheet is used for core materials thereof, it is eagerly demanded to enhance the efficiency and to reduce the size, due to the movement of global environmental conservation represented by global power reduction, energy saving, $CO_2$ emission reduction, and the like. Under the social situation, it is demanded to improve the performance for the non oriented electrical steel sheet.

In general, a motor consists of a stator and a rotor. In recent years, the interior permanent magnet motor (hereinafter, referred to as “IPM motor”) in which permanent magnets are included inside the rotor is mainly used as the drive motor for electric vehicles, hybrid electric vehicles, and the like, and the technological development thereof is proceeded for higher efficiency, higher output, higher speed rotation, and smaller size.

In order to improve the performance of the IPM motor, it is necessary to bring the stator close to the permanent magnets inside the rotor, and thus, it is necessary to reduce the distance from the outer edge of the rotor core to the permanent magnets inside the rotor. On the other hand, when being rotated, centrifugal force caused by the rotated permanent magnets is applied to the outer edge of the rotor core, and the force thereby increases with high speed rotation. Thus, the strength of a part between the outer edge of the rotor core and the slot for the permanent magnets (hereinafter, referred to as “bridge part”), especially the fatigue strength, is important. For instance, with respect to the above, the following techniques are disclosed.

Patent Document 1 discloses the technique to increase the strength of the electrical steel sheet itself which is used for the rotor core. Patent Document 2 discloses the technique to conduct work hardening and quench hardening in order to strengthen the predetermined part, because the part which needs to be strengthened in the rotor core is the bridge part as mentioned above. Patent Document 3 discloses the technique to reinforce the rotor from the outside with a ring and the like, in order to increase the strength of the entire rotor core.

However, the technique of Patent Document 1 has a disadvantage such that the punchability of the blank of the rotor core deteriorates because the strength of the electrical steel sheet itself is increased. The decrease in punchability causes a decrease in accuracy of the blank when being punched, a decrease in punching speed, a damage of punching die, or the like. The technique of Patent Document 2 increases the cost because an additional process to only strengthen the bridge part is necessary when producing the rotor core. Moreover, the technique of Patent Document 3 increases the cost because the ring to reinforce the rotor from the outside is necessary.

Therefore, it is desired to develop a technique for increasing the strength, especially the fatigue strength, of the predetermined part without increasing the strength of the electrical steel sheet itself and without adding an additional process.

As mentioned above, the centrifugal force caused by rotating the motor is repeatedly applied to the bridge part of the rotor core, and thus, it is necessary to increase the fatigue strength at the bridge part. As a typical method for improving the fatigue strength, there is a method for hardening the surface of steel (sheet).

As the method for hardening the surface, for instance, there are transformation strengthening of steel itself represented by quenching and the like, precipitation strengthening to form the second phase by nitriding, carburizing, and the like, and work hardening to induce the strain by shot peening and the like. However, for the above, the additional process is necessary.

In the past, for the non oriented electrical steel sheet, the technique which simultaneously improves both the fatigue strength and the magnetic characteristics without adding an additional process has not been established.

RELATED ART DOCUMENTS

Patent Documents

[Patent Document 1] Japanese Patent (Granted) Publication No. 5000136
[Patent Document 2] Japanese Patent (Granted) Publication No. 4160469
[Patent Document 3] Japanese Unexamined Patent Application, First Publication No. 2013-115899
[Patent Document 4] Japanese Patent (Granted) Publication No. 3307897
[Patent Document 5] Japanese Patent (Granted) Publication No. 4116748
[Patent Document 6] Japanese Patent (Granted) Publication No. 4116749

Non-Patent Documents

[Non-Patent Document 1] Tetsu-to-Hagane, Vol. 66 (1980), No. 7, p 1000-p 1009
[Non-Patent Document 2] Materia, Vol. 50 (2011), No. 3, p 126-p 128

SUMMARY OF INVENTION

Technical Problem to be Solved

The present invention has been made in consideration of the above mentioned situations. An object of the invention is to simultaneously improve both the fatigue strength and the magnetic characteristics without adding an additional process to the conventional producing method for the non oriented electrical steel sheet. Specifically, the object of the invention is to provide a non oriented electrical steel sheet excellent in the fatigue strength and the magnetic characteristics and also excellent in cost.

Solution to Problem

In order to solve the above problem, the present inventors have made a thorough investigation to form a hardened surface layer for a silicon steel sheet which is a base steel sheet of the non oriented electrical steel sheet by utilizing producing processes of the non oriented electrical steel sheet. As a result, it is found that, an internally oxidized layer is formed in a surface of the silicon steel sheet by favorably combining steel compositions and producing conditions, the surface is hardened by controlling the hardness of the internally oxidized layer, and thereby, the fatigue strength can be increased.

Herein, as disclosed in Patent Documents 4 to 6, when the thickness of the internally oxidized layer is thickened, iron loss in high frequency is adversely affected. Thus, the present inventors have made a thorough investigation such that oxides in the internally oxidized layer and thickness of the internally oxidized layer are controlled, hardness of the internally oxidized layer is controlled, and thereby, the fatigue strength and the magnetic characteristics are improved at the same time.

As a result, it is found that, by conducting heat conservation treatment during cooling after hot rolling for a steel sheet with adjusted steel composition and by controlling conditions of the heat conservation treatment properly, it is possible to control the oxides in the internally oxidized layer and the average thickness of the internally oxidized layer, and it is possible to control the hardness of the internally oxidized layer. Specifically, it is found that it is possible to obtain the non oriented electrical steel sheet in which the fatigue strength and the magnetic characteristics are improved at the same time without adding an additional process.

An aspect of the present invention employs the following.

(1) A non oriented electrical steel sheet according to an aspect of the present invention consists of a silicon steel sheet and an insulation coating, characterized in that the silicon steel sheet contains, as a chemical composition, by mass %, more than 2.00 to 4.00% of Si,
0.10 to 3.00% of Al,
0.10 to 2.00% of Mn,
0.0030% or less of C,
0.050% or less of P,
0.005% or less of S,
0.005% or less of N,
0 to 0.40% of Sn,
0 to 1.00% of Cu,
0 to 0.40% of Sb,
0 to 0.0400% of REM,
0 to 0.0400% of Ca,
0 to 0.0400% of Mg, and
a balance consisting of Fe and impurities, when viewing a cross section whose cutting direction is parallel to a thickness direction and when a central area is a thickness range of ⅝ to ⅜ of the silicon steel sheet, a Vickers hardness in the central area is 120 to 300 HV, and when viewing the cross section, the silicon steel sheet includes an internally oxidized layer containing $SiO_2$ in a surface thereof, an average thickness of the internally oxidized layer is 0.10 to 5.0 μm, and a Vickers hardness in the internally oxidized layer is 1.15 to 1.5 times as compared with the Vickers hardness in the central area.

(2) In the non oriented electrical steel according to (1), the silicon steel sheet may contain, as the chemical composition, by mass %, at least one selected from a group consisting of 0.02 to 0.40% of Sn,
0.10 to 1.00% of Cu, and
0.02 to 0.40% of Sb.

(3) In the non oriented electrical steel according to (1) or (2), the silicon steel sheet may contain, as the chemical composition, by mass %, at least one selected from a group consisting of 0.0005 to 0.0400% of REM,
0.0005 to 0.0400% of Ca, and
0.0005 to 0.0400% of Mg.

(4) In the non oriented electrical steel according to any one of (1) to (3), the Vickers hardness in the internally oxidized layer may be 155 HV or more.

(5) In the non oriented electrical steel according to any one of (1) to (4), the average thickness of the internally oxidized layer may be 0.55 μm or more.

Effects of Invention

According to the above aspects of the present invention, it is possible to provide the non oriented electrical steel sheet excellent in the fatigue strength and the magnetic characteristics and also excellent in cost.

DETAILED DESCRIPTION OF PREFERRED EMBODIMENTS

Figure 1:
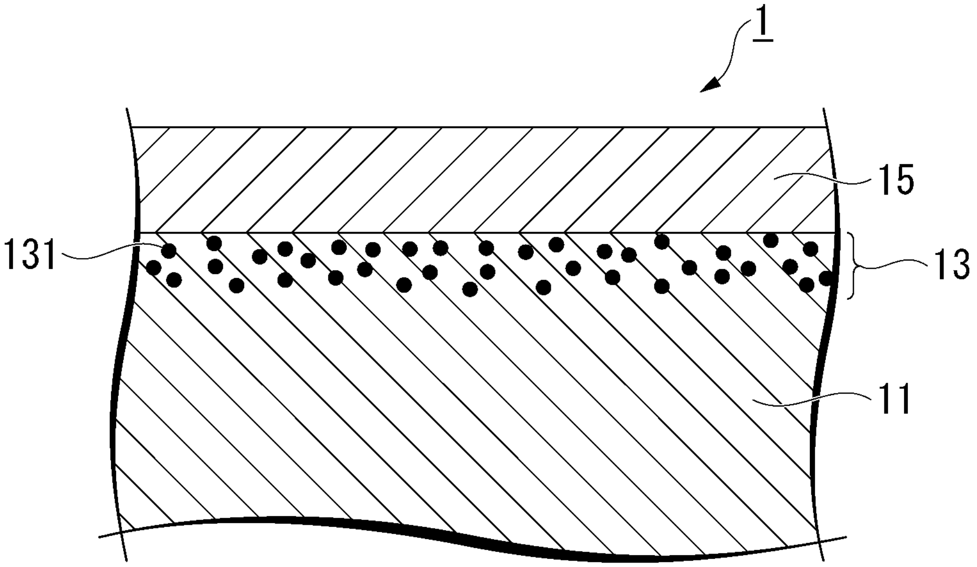
FIG. 1 is a cross sectional illustration of a non oriented electrical steel sheet according to an embodiment of the present invention.

Hereinafter, a preferable embodiment of the present invention is described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" does not include in the limitation range. "%" of the amount of respective elements expresses "mass %".

First, the limitation reasons in regard to the chemical composition of the silicon steel sheet which is the base steel sheet for the non oriented electrical steel sheet according to the embodiment (hereinafter, it may be referred to as "the present electrical steel sheet") are explained.

<Chemical Composition of Silicon Steel Sheet>

In the embodiment, the silicon steel sheet contains, as a chemical composition, base elements, optional elements as necessary, and a balance consisting of Fe and impurities.

In the embodiment, Si, Al, and Mn are the base elements (main alloying elements) in the chemical composition of the silicon steel sheet.

More than 2.00 to 4.00% of Si

Si (silicon) is an element which has the effect of reducing the eddy current loss by increasing the electrical resistance, and thereby reducing the iron loss. Moreover, Si is the element which has the effect of improving the tensile strength and the fatigue strength by increasing the yield ratio of the steel sheet because of the solute strengthening. Moreover, as explained below, Si is the element necessary for forming $SiO_2$ in the internally oxidized layer and for hardening the surface of the steel sheet.

When the Si content is 2.00% or less, it is difficult to obtain the above effect and to harden the internally oxidized layer. Thus, the Si content is to be more than 2.00%. The Si content is preferably 2.10% or more, more preferably 2.30% or more, and further more preferably 2.60% or more. On the other hand, when the Si content is more than 4.00%, the magnetic flux density decreases, the operability for the cold rolling and the like deteriorates, and the production cost increases. Thus, the Si content is to be 4.00% or less. The Si content is preferably 3.70% or less, and more preferably 3.40% or less.

0.10 to 3.00% of Al

In common with Si, Al (aluminum) is an element which has the effect of reducing the eddy current loss by increasing the electrical resistance, and thereby reducing the iron loss. However, Al is the element whose effect of increasing the hardness is small as compared with that of Si. Moreover, Al is the element which has the effect of improving the magnetic flux density by increasing $B_{50}/Bs$ which is the ratio of the magnetic flux density $B_{50}$ to the saturation magnetic flux density Bs.

When the Al content is less than 0.10%, the addition effect is not sufficiently obtained. Thus, the Al content is to be 0.10% or more. The Al content is preferably 0.30% or more, more preferably 0.50% or more, and further more preferably 0.60% or more. On the other hand, when the Al content is more than 3.00%, the magnetic flux density decreases because the saturation magnetic flux density decreases, and the tensile strength and the fatigue strength decrease because the yield ratio decreases. Thus, the Al content is to be 3.00% or less. The Al content is preferably 2.70% or less, and more preferably 2.40% or less.

0.10 to 2.00% of Mn

Mn (manganese) is an element which has the effect of reducing the eddy current loss by increasing the electrical resistance and of suppressing the formation of {111}<112> texture which is undesirable for magnetic characteristics.

When the Mn content is less than 0.10%, the addition effect is not sufficiently obtained. Thus, the Mn content is to be 0.10% or more. The Mn content is preferably 0.15% or more, more preferably 0.20% or more, further more preferably more than 0.60%, and further more preferably 0.70% or more. On the other hand, when the Mn content is more than 2.00%, the grain growth during annealing is suppressed, and the iron loss deteriorates. Thus, the Mn content is to be 2.00% or less. The Mn content is preferably 1.70% or less, and more preferably 1.50% or less.

In the embodiment, the silicon steel sheet contains the impurities as the chemical composition. The impurities correspond to elements which are contaminated during industrial production of steel from ores and scrap that are used as a raw material of steel, or from environment of a production process. For instance, the impurities are elements such as C, P, S, and N. It is preferable that the impurities are limited as follows in order to sufficiently obtain the effects of the embodiment. Moreover, since it is preferable that the amount of respective impurities is low, a lower limit of the respective impurities does not need to be limited, and the lower limit may be 0%.

0.0030% or Less of C

C (carbon) is an impurity element which causes the deterioration of the iron loss and the magnetic aging. When the C content is more than 0.003%, the iron loss deteriorates, and the magnetic aging occurs excessively. Thus, the C content is to be 0.0030% or less. The C content is preferably 0.0020% or less, and more preferably 0.0010% or less. The lower limit thereof includes 0%. However, it is difficult to control the content to be 0% due to production technology. The practical lower limit thereof is substantially 0.0001%.

0.050% or Less of P

Although P (phosphorus) may contribute to the improvement of the tensile strength, P is an impurity element which embrittles the steel sheet. When the P content is more than 0.050%, the steel sheet including 2.00% or more of Si becomes brittle significantly. Thus, the P content is to be 0.050% or less. The P content is preferably 0.030% or less, and more preferably 0.020% or less. The lower limit thereof includes 0%. However, it is difficult to control the content to be 0% due to production technology. The practical lower limit thereof is substantially 0.002%.

0.005% or Less of S

S (sulfur) is an impurity element which forms fine sulfides such as MnS, and thus, suppresses the recrystallization and the grain growth during final annealing. When the S content is more than 0.005%, the recrystallization and the grain growth during final annealing are suppressed significantly. Thus, the S content is to be 0.005% or less. The S content is preferably 0.003% or less, and more preferably 0.002% or less. The lower limit thereof includes 0%. However, it is difficult to control the content to be 0% due to production technology. The practical lower limit thereof is substantially 0.0003%.

0.005% or Less of N

N (nitrogen) is an impurity element which forms fine nitrides such as AlN, and thus, suppresses the recrystallization and the grain growth during final annealing. When the N content is more than 0.005%, the recrystallization and the grain growth during final annealing are suppressed significantly. Thus, the N content is to be 0.005% or less. The N content is preferably 0.003% or less, and more preferably 0.002% or less. The lower limit thereof includes 0%. However, it is difficult to control the content to be 0% due to production technology. The practical lower limit thereof is substantially 0.0005%.

In the embodiment, the silicon steel sheet may contain the optional element in addition to the base elements and the impurities described above. For instance, as substitution for a part of Fe which is the balance described above, as the optional element, the steel sheet may contain Sn, Cu, Sb, REM, Ca, and Mg. The optional elements may be contained as necessary. Thus, a lower limit of the optional element does not need to be limited, and the lower limit may be 0%. Moreover, even if the optional element may be contained as impurities, the above mentioned effects are not affected.

0 to 0.40% of Sn 0 to 1.00% of Cu 0 to 0.40% of Sb

Sn (tin), Cu (copper), and Sb (antimony) are elements which have the effect of suppressing the formation of {111}<112> texture which is undesirable for magnetic characteristics, of suppressing the oxidation of steel sheet surface, and of controlling the grain growth to be uniform. In addition, Sn, Cu, and Sb are elements which have the effect of favorably controlling the thickness of the internally oxidized layer for the hot rolled steel sheet.

When the Sn content is more than 0.40%, when the Cu content is more than 1.00%, or when the Sb content is more than 0.40%, the addition effect is saturated, the grain growth during final annealing are suppressed, and the steel sheet becomes brittle during cold rolling due to the decrease in workability. Thus, the Sn content is to be 0.40% or less, the Cu content is to be 1.00% or less, and the Sb content is to be 0.40% or less. The Sn content is preferably 0.30% or less, and more preferably 0.20% or less. The Cu content is preferably 0.60% or less, and more preferably 0.40% or less. The Sb content is preferably 0.30% or less, and more preferably 0.20% or less.

The lower limits of Sn, Cu, and Sb are not particularly limited, and may be 0%. In order to favorably obtain the above effects, the Sn content may be 0.02% or more, the Cu content may be 0.10% or more, and the Sb content may be 0.02% or more. The Sn content is preferably 0.03% or more, and more preferably 0.05% or more. The Cu content is preferably 0.20% or more, and more preferably 0.30% or more. The Sb content is preferably 0.03% or more, and more preferably 0.05% or more.

In the embodiment, it is preferable that the silicon steel sheet contains, as the chemical composition, by mass %, at least one selected from the group consisting of 0.02 to 0.40% of Sn, 0.10 to 1.00% of Cu, and 0.02 to 0.40% of Sb.

0 to 0.0400% of REM 0 to 0.0400% of Ca 0 to 0.0400% of Mg

REM (Rare Earth Metal), Ca (calcium), and Mg (magnesium) are the elements which have the effects of fixing S as sulfides or oxysulfides, of suppressing the fine precipitation of MnS and the like, and of promoting the recrystallization and grain growth during final annealing.

When REM, Ca, and Mg exceed 0.0400%, the sulfides or oxysulfides are excessively formed, and the recrystallization and grain growth during final annealing are suppressed. Thus, the REM content, the Ca content, and the Mg content are to be 0.0400% or less respectively. The respective contents are preferably 0.0300% or less and more preferably 0.0200% or less.

The lower limits of REM content, Ca content, and Mg content are not particularly limited, and may be 0%. The REM content, the Ca content, and the Mg content may be 0.0005% or more in order to obtain the above effects preferably. The respective contents are preferably 0.0010% or more and more preferably 0.0050% or more.

In the embodiment, it is preferable that the silicon steel sheet contains, as the chemical composition, by mass %, at least one selected from the group consisting of 0.0005 to 0.0400% of REM, 0.0005 to 0.0400% of Ca, and 0.0005 to 0.0400% of Mg.

Herein, REM indicates a total of 17 elements of Sc, Y and lanthanoid, and is at least one of them. The above REM content corresponds to the total content of at least one of these elements. Industrially, misch metal is added as the lanthanoid.

The steel composition as described above may be measured by typical analytical methods for steel. For instance, the steel composition may be measured by using ICP-AES (Inductively Coupled Plasma-Atomic Emission Spectrometer: inductively coupled plasma emission spectroscopy spectrometry). In addition, C and S may be measured by the infrared absorption method after combustion, N may be measured by the thermal conductometric method after fusion in a current of inert gas, and O may be measured by, for instance, the non-dispersive infrared absorption method after fusion in a current of inert gas.

The above chemical composition is that of the silicon steel sheet. When the non oriented electrical steel sheet to be the measurement sample has the insulation coating and the like on the surface, the above chemical composition is obtained after removing the coating.

As a method for removing the insulation coating and the like of the non oriented electrical steel sheet, for instance, the following method is exemplified. First, the non oriented electrical steel sheet having the insulation coating and the like is immersed in sodium hydroxide aqueous solution, sulfuric acid aqueous solution, and nitric acid aqueous solution in this order. The steel sheet after the immersion is washed. Finally, the steel sheet is dried with warm air. Thereby, it is possible to obtain the silicon steel sheet from which the insulation coating is removed.

Next, in regard to the non oriented electrical steel sheet according to the embodiment, the internally oxidized layer of the silicon steel sheet is explained.

FIG. 1 is a cross sectional illustration of the non oriented electrical steel sheet according to the embodiment. When viewing a cross section whose cutting direction is parallel to a thickness direction, the non oriented electrical steel sheet 1 according to the embodiment includes the silicon steel sheet 11, and the insulation coating 15 arranged on the silicon steel sheet 11. The silicon steel sheet includes the internally oxidized layer 13 in the surface thereof. The internally oxidized layer 13 includes $SiO_2$ 131. Herein, the internally oxidized layer is a region where oxide phase of Si and the like is dispersed in the form of particles or layers inside the silicon steel sheet.

<$SiO_2$ in Internally Oxidized Layer>

The internally oxidized layer includes $SiO_2$. In the embodiment, by finely and densely precipitating $SiO_2$ in the internally oxidized layer and by controlling the hardness of the internally oxidized layer, it is possible to obtain the effect of improving the fatigue strength.

In order to finely and densely precipitate $SiO_2$ in the internally oxidized layer, the steel sheet needs to contain more than 2.00% of Si. In addition, the heat conservation treatment during cooling after hot rolling needs to be favorably controlled.

<Average Thickness of Internally Oxidized Layer>

Average Thickness of Internally Oxidized Layer: 0.10 to 5.0 μm

When the average thickness of the internally oxidized layer is less than 0.10 μm, it is difficult to obtain the effect of improving the fatigue strength. Thus, the average thickness of the internally oxidized layer is to be 0.10 μm or more. The average thickness of the internally oxidized layer is preferably more than 0.5 μm, more preferably 0.55 μm or more, further more preferably 0.6 μm or more, further more preferably 0.7 μm or more, and further more preferably 1.0 μm or more. On the other hand, when the average thickness of the internally oxidized layer is more than 5.0 μm, the magnetic characteristics, specifically the iron loss, deteriorates. Thus, the average thickness of the internally oxidized layer is to be 5.0 μm or less. The average thickness of the internally oxidized layer is preferably 4.0 μm or less, and more preferably 3.0 μm or less.

<Vickers Hardness>

In the embodiment, the Vickers hardness in the internally oxidized layer is controlled to be higher than the Vickers hardness in the central area of the steel sheet. Specifically, in the embodiment, the fatigue strength is improved not by increasing the hardness of the electrical steel sheet in itself but by increasing only the hardness of the predetermined region.

<Vickers Hardness in Central Area of Steel Sheet>

Vickers hardness in central area of steel sheet: 120 to 300 HV When viewing the cross section whose cutting direction is parallel to the thickness direction, the central area is a thickness range of ⅝ to ⅜ of the silicon steel sheet. When the Vickers hardness in the central area is less than 120 HV, sufficient fatigue strength is not obtained. Thus, the Vickers hardness in the central area is to be 120 HV or more. The Vickers hardness in the central area is preferably 150 HV or more, and more preferably 170 HV or more.

On the other hand, when the Vickers hardness in the central area is more than 300 HV, the entire steel sheet is excessively hard, and the punchability deteriorates. Thus, the Vickers hardness in the central area is to be 300 HV or less. The Vickers hardness in the central area is preferably 270 HV or less, and more preferably 250 HV or less.

Herein, it is possible to control the Vickers hardness in the central area by the solid solution strengthening of Si, Al, and Mn to Fe and by the grain size after final annealing. The Si content, the Al content, and the Mn content may be determined, and the grain size after final annealing may be determined, depending on the required magnetic characteristics, the required workability during cold rolling, the production cost, and the like. Herein, the grain size influences the magnetic characteristics, especially the iron loss.

<Vickers Hardness in Internally Oxidized Layer>

Vickers Hardness in Internally Oxidized Layer: 1.15 Times or More as Compared with Vickers Hardness in Central Area It is possible to increase the fatigue strength by finely and densely precipitating $SiO_2$ in the internally oxidized layer and by controlling the hardness of the internally oxidized layer. Specifically, in the embodiment, the Vickers hardness in the internally oxidized layer is higher than the Vickers hardness in the central area of the steel sheet.

When the Vickers hardness in the internally oxidized layer is less than 1.15 times as compared with the Vickers hardness in the central area, it is difficult to sufficiently obtain the effect of improving the fatigue strength. Thus, the Vickers hardness in the internally oxidized layer is 1.15 times or more as compared with the Vickers hardness in the central area. The Vickers hardness in the internally oxidized layer is preferably 1.20 times or more, and more preferably 1.25 times or more.

The upper limit of the Vickers hardness in the internally oxidized layer is not particularly limited for the improvement of the fatigue strength. Substantial maximum of the Vickers hardness in the internally oxidized layer may be 1.5 times as compared with the Vickers hardness in the central area.

The Vickers hardness in the internally oxidized layer is to be 1.15 times or more as compared with the Vickers hardness in the central area, and thus, may be 138 HV or more. The Vickers hardness in the internally oxidized layer is preferably 155 HV or more, more preferably 180 HV or more, and further more preferably 200 HV or more. The Vickers hardness in the internally oxidized layer is preferably 400 HV or less, and more preferably 300 HV or less.

The observation of the microstructure and the measurement of the hardness of the internally oxidized layer and the central area of the silicon steel sheet as explained above may be conducted by typical observation and measurement methods. For instance, the following method may be employed.

The specimens are cut out from the non oriented electrical steel sheet so that the cutting direction is parallel to the thickness direction (specifically, the specimens are cut out so that the cross section is parallel to the thickness direction and is perpendicular to the rolling direction). The cross-sectional structure of the cross section is observed with SEM (Scanning Electron Microscope) at a magnification at which each layer is included in the observed visual field. For instance, in observation with a reflection electron composition image (COMP image), it is possible to infer a constituent phase in the cross-sectional structure. For instance, in the COMP image, the silicon steel sheet can be distinguished as light color, $SiO_2$ in the internally oxidized layer as dark color, and the insulation coating as intermediate color. As necessary, the constituent phase may be identified in detail by quantitatively analyzing the chemical composition using SEM-EDX (energy dispersive X-ray spectroscopy).

Moreover, it is possible to identify whether or not the internally oxidized layer is included in a surface area of the silicon steel sheet by SEM and SEM-EDX. Specifically, it is confirmed whether or not the region where $SiO_2$ is observed is included from an interface between the silicon steel sheet and an upper layer thereof toward a depth direction of the silicon steel sheet. $SiO_2$ may be identified as the precipitate in which the atomic ratio of Si and O is approximately 1:2 in the observed visual field by EDX. For instance, in the observed visual field, a straight line along the thickness direction is set as a reference line, and then, it is confirmed whether or not the region where $SiO_2$ is observed is included on the reference line. When the region where $SiO_2$ is observed is included in the silicon steel sheet, the region is judged to be the internally oxidized layer. Moreover, the line segment (length) of the region on the reference line may be judged to be the thickness of the internally oxidized layer.

The average thickness of the internally oxidized layer may be determined as follows. An area of approximately 100 μm or more in a planar direction in the steel sheet is observed using SEM. Ten lines or more of the above reference lines are set at even intervals, and the thickness of the internally oxidized layer is measured on each reference line. An average of the obtained thicknesses of the internally oxidized layer is regarded as the average thickness of the internally oxidized layer.

Herein, when it is needed to observe a micro area which is smaller than a spatial resolution of SEM in order to identify $SiO_2$ or to determine the average thickness of the internally oxidized layer, a transmission electron microscope (TEM) may be used.

The Vickers hardness may be measured on the basis of a method disclosed in JIS Z 2244: 2009. When the Vickers hardness in the internally oxidized layer is measured, an indentation for the Vickers hardness needs to be within the internally oxidized layer. In the case, the measuring load is preferably within $9.8\times10^{-5}$ to $9.8\times10^{-2}$ N.

The Vickers hardness in the internally oxidized layer may be measured according to the thickness of the internally oxidized layer, and can be accurately measured when the load is appropriately set so that the maximum size of the indentation is applied within the thickness of the internally oxidized layer. In order to accurately measure the Vickers hardness in the internally oxidized layer, the load may be more than the above range of the load.

For the measurement of the Vickers hardness, the indentation size is generally measured using an optical microscope. In order to accurately measure the Vickers hardness, the indentation size may be measured at a magnification of 1000-fold or more using the electron microscope such as SEM.

On the other hand, it is preferable that the Vickers hardness in the central area of the steel sheet is measured by the same load as that applied for measuring the Vickers hardness in the internally oxidized layer. In the case, the indentation size is small as compared with grain size of the steel sheet. Thus, it is preferable that the indentation is applied away from a grain boundary, and then the indentation size is measured.

In the measurement of the Vickers hardness specified in JIS, the measuring load is provided from 1 gf ($9.8\times10^{-2}$ N). However, when the Vickers hardness is measured, it is preferable that the load is precisely controlled, is reduced, and is set so that the indentation size becomes within the internally oxidized layer. Herein, when it is needed to observe a micro area which is smaller than the spatial resolution of the optical microscope or SEM for measuring the Vickers hardness, the hardness value measured by a nanoindentation method may be converted to the Vickers hardness.

Next, a producing method for the non oriented electrical steel sheet according to the embodiment is explained.

Figure 2:
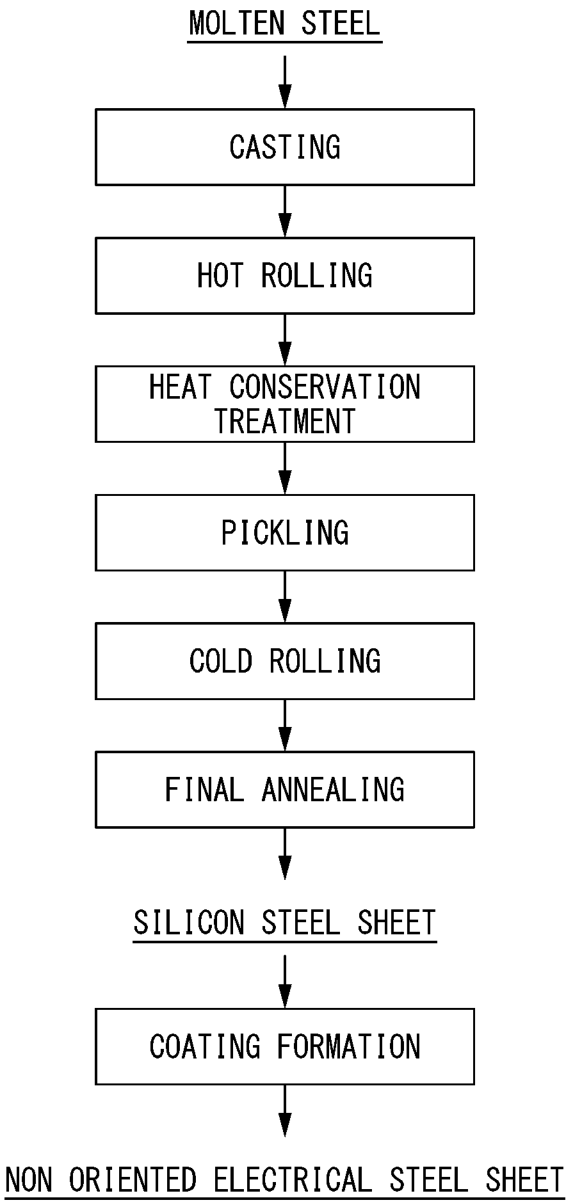
FIG. 2 is a flow chart illustrating a producing method for the non oriented electrical steel sheet according to the embodiment.

FIG. 2 is a flow chart illustrating a producing method for the non oriented electrical steel sheet according to the embodiment. In the embodiment, the silicon steel sheet is obtained by casting molten steel with an adjusted composition, by being hot-rolled, by being heat-conservation-treated during cooling after hot rolling, by being pickled, by being cold-rolled, and then by being final-annealed. Further, the non oriented electrical steel sheet is obtained by forming the insulation coating on the silicon steel sheet.

Figure 3:
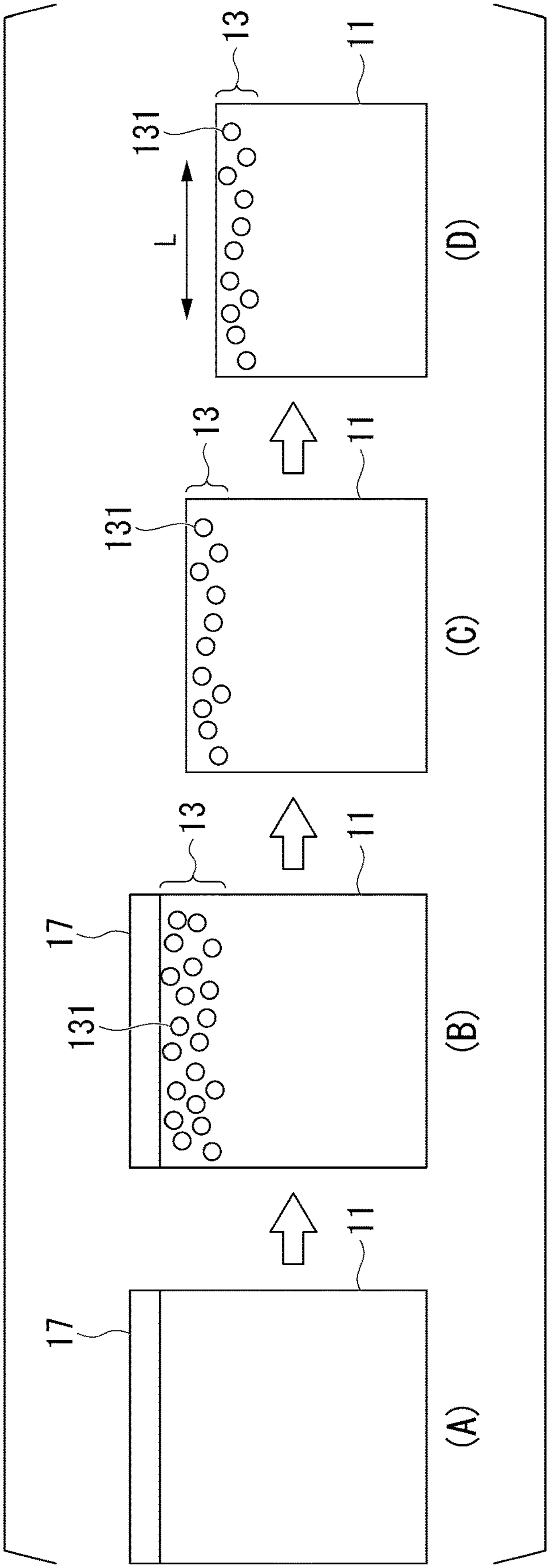
FIG. 3 is a cross sectional illustration showing a situation such that an internally oxidized layer is formed in a base steel sheet for the non oriented electrical steel sheet according to the embodiment.

The formation of the internally oxidized layer is explained. FIG. 3 is a cross sectional illustration showing a situation such that the internally oxidized layer is formed in the base steel sheet. FIG. 3(A) shows a situation after hot rolling, FIG. 3(B) shows a situation after heat conservation treatment, FIG. 3(C) shows a situation after pickling, and FIG. 3(D) shows a situation after cold rolling.

As shown in FIG. 3(A), by hot rolling, an externally oxidized layer 17 is formed on the surface of the base steel sheet 11. Subsequently, as shown in FIG. 3(B), by the heat conservation treatment during cooling after hot rolling, oxygen diffuses from the externally oxidized layer 17 to the base steel sheet 11, and the internally oxidized layer 13 is formed. At this time, it is preferable to finely and densely precipitate $SiO_2$ 131 in the internally oxidized layer 13 by controlling conditions of the heat conservation treatment.

Subsequently, as shown in FIG. 3(C), by pickling, the externally oxidized layer 17 on the surface of the base steel sheet 11 is removed. At this time, in order to improve the magnetic characteristics, a part of the internally oxidized layer 13 may be removed by pickling, and thereby, the thickness of the internally oxidized layer 13 may be controlled. Furthermore, as shown in FIG. 3(D), by cold rolling, the internally oxidized layer 13 in the surface of the base steel sheet 11 is extended in the rolling direction L. After cold rolling, the internally oxidized layer 13 may be remained. Alternatively, when the thickness of the internally oxidized layer 13 is excessive, a part of the internally oxidized layer 13 may be removed by pickling, and thereby, the thickness of the internally oxidized layer 13 may be controlled.

Thereafter, for instance, the final annealing is conducted in the atmosphere including nitrogen and hydrogen, the recrystallization and the grain growth are proceeded in the base steel sheet, and thereby, it is possible to obtain the silicon steel sheet in which the internally oxidized layer containing $SiO_2$ is included in the surface thereof.

The insulation coating may be formed on the surface of the silicon steel sheet. The insulating coating is generally a coating called a semi-organic coating. For instance, a coating including chromic acid and organic resin disclosed in Non-Patent Document 1 or a coating including phosphate and organic resin disclosed in Non-Patent Document 2 is general. The amount of the insulation coating is preferably 0.1 to 5 $gm^{-2}$ per one side.

In the non oriented electrical steel sheet according to the embodiment, the silicon steel sheet includes the internally oxidized layer, the internally oxidized layer includes $SiO_2$, the average thickness of the internally oxidized layer is 0.10 to 5.0 μm, the Vickers hardness in the central area of the steel sheet is 120 to 300 HV, and the Vickers hardness in the internally oxidized layer is 1.15 to 1.5 times as compared with the Vickers hardness in the central area.

The silicon steel with the above features may be produced by the following method for instance.

<Hot Rolling>

A cast piece with the adjusted chemical composition is heated and hot-rolled. At this time, in order to suppress the deterioration of the iron loss caused by solid-soluting and precipitating the sulfides and the like in steel, the heating temperature is to be 1200° C. or less. Moreover, in order to ensure the final temperature of 900° C. or more, the heating temperature is to be 1080° C. or more.

When the final temperature of hot rolling is low, hot workability deteriorates, and thickness accuracy in the transverse direction of the steel sheet deteriorates. Thus, the lower limit of the final temperature is to be 900° C. On the other hand, when the final temperature of hot rolling is more than 1000° C., {100} texture which is favorable for the magnetic characteristics decreases. Thus, the upper limit of the final temperature is to be 1000° C.

In order to properly form the internally oxidized layer during the heat conservation treatment after hot rolling, it is preferable to form the externally oxidized layer with a thickness of 1 μm or more on the surface of the hot rolled steel sheet during hot rolling. The formation of the externally oxidized layer may be controlled by the temperature, holding time, and the like of hot rolling.

<Heat Conservation Treatment>

The hot rolled steel sheet is heat-conservation-treated during cooling after hot rolling. In the heat conservation treatment, the grains are coarsened so that the grain size is 20 μm or more. Moreover, oxygen included in the externally oxidized layer formed on the surface of the hot rolled steel sheet diffuses into the hot rolled steel sheet, and thereby, the internally oxidized layer is formed.

The internally oxidized layer is formed by diffusing oxygen into the steel sheet during the heat conservation treatment. At this time, the oxygen source is the externally oxidized layer formed during hot rolling, specifically the externally oxidized layer which mainly consists of magnetite and wustite, hematite, or the like.

During cooling after hot rolling, the hot rolled steel sheet is heat-conservation-treated under conditions such as the atmosphere with oxygen partial pressure of $10^{-15}$ Pa or more, the temperature range of 850° C. or less and 700° C. or more, and the time of 10 minutes or more and 3 hours or less. As a result, it is possible to form the internally oxidized layer in which $SiO_2$ is finely and densely precipitated, and possible to favorably control the hardness of the internally oxidized layer.

When the heat conservation temperature is more than 850° C., the average thickness of the internally oxidized layer is thickened. As a result, the average thickness of the internally oxidized layer is more than 5.0 μm even after cold rolling, and thus, the pickling to reduce the thickness of the internally oxidized layer may be overloaded. Moreover, when the heat conservation temperature is more than 850° C., it is difficult to finely and densely precipitate $SiO_2$. Thus, the heat conservation temperature is preferably 850° C. or less. On the other hand, in order to finely and densely precipitate $SiO_2$, although the Si content in steel influences a situation, the heat conservation temperature is preferably 700° C. or more, more preferably 750° C. or more, and further more preferably 800° C. or more.

The heat conservation time is preferably 10 minutes or more, in order to coarsen the grains to 20 μm or more in the hot rolled steel sheet. Moreover, in order to finely and densely precipitate $SiO_2$, the heat conservation time is preferably 10 minutes or more, more preferably 20 minutes or more, and further more preferably 30 minutes or more. On the other hand, the upper limit of the heat conservation time is not particularly limited. However, when the heat conservation time is excessive, grain boundaries become brittle near the surface of the steel sheet, and then cracks and fractures tend to occur in the following pickling and cold rolling. Thus, the heat conservation time is preferably 3 hours or less.

As the atmosphere during the heat conservation treatment, the oxygen partial pressure is preferably $10^{-15}$ Pa or more. The atmosphere is preferably the mixed atmosphere of inert gas such as nitrogen.

Herein, it is preferable that the externally oxidized layer of 1 μm or more is formed during hot rolling, and then, the heat conservation treatment is conducted so that the surface of the steel sheet is not exposed in the atmosphere of the heat conservation treatment. For instance, the heat conservation treatment is conducted after coiling the hot rolled steel sheet. In the case, since the sheet surfaces are contacted each other except for the outermost surface of coil, it is favorably suppressed that the surface of the steel sheet is exposed in the atmosphere of the heat conservation treatment.

When the steel sheet contains Sn, Cu, or Sb, these elements suppress to form and growth the internally oxidized layer, and thus, it is possible to increase the heat conservation temperature within the above range. In the case, it is possible to favorably coarsen the grain size, while suppressing the excessive growth of the internally oxidized layer. Moreover, when the steel sheet contains Sn, Cu, or Sb, by controlling the heat conservation temperature to 800° C. or more, it is possible to favorably improve the magnetic flux density, while forming the internally oxidized layer with favorable thickness.

However, when the heat conservation temperature is excessive high even when the steel sheet contains Sn, Cu, or Sb, the magnetic characteristics may be improved, but the internally oxidized layer may be excessively thickened. In the case, the amount of pickling may be controlled during pickling treatment, and thereby, the thickness of the internally oxidized layer may be appropriately controlled.

The mechanism such that Sn, Cu, and Sb contained in steel suppress to form and growth the internally oxidized layer is considered as follows. These elements segregate between the externally oxidized layer and the steel, and thereby, it is suppressed that oxygen included in the externally oxidized layer diffuses into the steel sheet.

In conventional technique, the hot rolled steel sheet after hot rolling is cooled to near room temperature, and thereafter, the hot rolled steel sheet annealing is conducted in the temperature range of 800 to 1000° C. for approximately 1 minute by reheating the steel sheet. On the other hand, in the embodiment, in order to favorably control the internally oxidized layer, the hot rolled steel sheet during cooling after hot rolling is heat-conservation-treated under the above conditions. Moreover, the steel sheet after heat conservation treatment is cooled to near room temperature, and thereafter, is subjected to pickling and cold rolling without conducting the hot rolled steel sheet annealing.

<Pickling>

The base steel sheet after the heat conservation treatment is pickled. The amount of pickling (weight loss after pickling) is controlled depending on the state of the externally oxidized layer and the internally oxidized layer on the surface of the steel sheet and on the conditions of acid used for pickling such as type, concentration, and temperature. In the pickling, the externally oxidized layer is made to be dissolved, and the internally oxidized layer is made to be thinned to the predetermined thickness.

For instance, as the method for controlling the amount of pickling to be small, a method of shortening the pickling time, decreasing the temperature of the pickling solution, or adding a commercially available pickling inhibitor (polyamine or the like) is effective. For instance, the pickling inhibitor includes mainly polyamine, and the polymer thereof has a property of being easily adsorbed on unshared electron pairs of iron atoms. The polymer adheres to the surface of the steel sheet, the area in contact with the acid is reduced, and thus, the pickling rate is reduced. Formic acid and the like are known as additives which enhance the above effect.

On the other hand, as the method for controlling the amount of pickling to be large, a method of prolonging the pickling time, increasing the temperature of the pickling solution, or adding a commercially available pickling accelerator (sodium thiosulfate or the like) is effective. The pickling accelerator includes chelating agent for iron atoms, and has a property of easily forming a coordination bond to iron ion. When the pickling accelerator is included, iron dissolved in the pickling solution is chelated. As a result, the concentration of iron ions dissolved in the pickling solution does not increase easily, the dissolution rate of iron does not decrease, and the pickling proceeds.

<Cold Rolling>

The base steel sheet after the pickling is cold-rolled. In order to improve the magnetic flux density, the reduction of cold rolling is preferably 50 to 90%. The reduction of cold rolling is the cumulative reduction of cold rolling and is obtained by (thickness of steel sheet before cold rolling−thickness of steel sheet after cold rolling)÷thickness of steel sheet before cold rolling×100. It is desirable to determine the reduction of cold rolling in consideration of the thickness of final product, cold workability, and the like.

<Final Annealing>

The base steel sheet after the cold rolling is final-annealed. The final annealing is a process of recrystallizing the cold rolled steel sheet and controlling the grain size, in order to improve the magnetic characteristics, particularly to improve the magnetic flux density and the iron loss. Atmosphere is important for the final annealing. Since the magnetic characteristics deteriorate when the steel sheet is oxidized, oxygen concentration in the atmosphere for the final annealing is preferably several tens of ppm or less.

The atmospheric gas is preferably nitrogen or argon, and hydrogen may be mixed as necessary in order to suppress the oxidation of the steel sheet. Herein, when the hydrogen concentration is excessively increased, the internally oxidized layer is reduced, and the fine $SiO_2$ which improves the fatigue strength is reduced.

The final annealing temperature is preferably 700° C. or more in which the recrystallization of the steel sheet occurs. When the final annealing temperature is excessively lower, the recrystallization becomes insufficient. On the other hand, when final annealing temperature is excessively higher, fine $SiO_2$ included in the internally oxidized layer is grown, and thus, the effect of improving the fatigue strength is not obtained. Thus, the final annealing temperature is preferably 1150° C. or less.

The insulation coating is formed for the silicon steel sheet after the final annealing. For instance, the insulation coating may be a coating including chromic acid and organic resin or a coating including phosphate and organic resin. The amount of the insulation coating is preferably 0.1 to 5 $gm^{-2}$ per one side.

EXAMPLES

Hereinafter, the effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

The molten steel with the adjusted composition was cast, and then, the silicon steel sheet was produced by controlling the production conditions in each process. The chemical compositions are shown in Tables 1 and 2, and the production conditions are shown in Tables 3 and 4. In the above production, the hot rolling was conducted under the conditions such that the heating temperature was 1180° C. and the temperature of outlet side of final rolling was 970° C., and the hot rolled steel sheet with the thickness of 2.0 mm was produced. At this time, the layer with the thickness of approximately 10 μm which consisted of mainly $Fe_3O_4$ was formed on the surface as the externally oxidized layer.

The obtained hot rolled steel sheet during cooling after hot rolling is subjected to the heat conservation treatment in the atmosphere where the oxygen partial pressure was $10^{-15}$ Pa or more at the temperature and time shown in Tables 3 and 4. Thereby, the grains were grown to 20 μm or more, and the internally oxidized layer was formed. Herein, the specimen described as "hot rolled steel sheet annealing" in the "heat conservation treatment" column in Table 4 was cooled to room temperature without the heat conservation treatment during cooling after hot rolling, and thereafter, the hot rolled steel sheet annealing was conducted in the atmosphere of 100% nitrogen at 800° C. for 60 seconds.

The steel sheet which was heat-conservation-treated or hot-rolled-steel-sheet-annealed after hot rolling was subjected to the pickling by being immersed for 30 seconds in hydrochloric acid (10 mass %) which was at 85° C. and which included the additives (0.05 mass %) shown in Tables 3 and 4. The steel sheet after pickling was subjected to the cold rolling whose reduction was 75% in order to obtain the cold rolled steel sheet with the thickness of 0.5 mm. The cold rolled steel sheet was subjected to the final annealing at 1000° C. for 30 seconds in the atmosphere of 10% hydrogen and 90% nitrogen. At this time, the dew point of the above atmosphere was −30° C. Moreover, for the silicon steel sheet after final annealing, the phosphate based insulation coating with the average thickness of 1 μm was formed.

Thereafter, the magnetic characteristics ($B_{50}$ and $W_{15/50}$), the fatigue strength, the Vickers hardness in the internally oxidized layer, and the Vickers hardness in the central area of the steel sheet were measured. The results are shown in Tables 5 and 6.

Magnetic Characteristics ($B_{50}$ and $W_{15/50}$)

A sample with 55 mm square was cut and taken from the produced non oriented electrical steel sheet, and then $B_{50}$ and $W_{15/50}$ were measured by the single sheet tester (SST), herein $B_{50}$ indicating the magnetic flux density in units of T (tesla) when the steel sheet be excited under magnetic field strength of 5000 A/m, and $W_{15/50}$ indicating the iron loss when the steel sheet be excited under conditions such that 50 Hz and the magnetic flux density of 1.5 T.

Evaluation Criteria of $B_{50}$

Acceptable: 1.65 T or more

Unacceptable: less than 1.65 T

Evaluation Criteria of $W_{15/50}$

Acceptable: 3.0 W/kg or less

Unacceptable: more than 3.0 W/kg

Fatigue Strength

From the produced non oriented electrical steel sheet, a sample corresponding to No. 5 specimen specified in Annex B of JIS Z 2241: 2011 was taken by electrical discharge machining along the rolling direction of the steel sheet, and the fatigue test was conducted under the following conditions. A test was conducted in which the stress ratio was kept constant and accordingly the minimum and maximum stresses were changed. The stress conditions in which two specimens or more in three specimens were not fractured by two million repetitions were determined, and the average stress ((minimum stress+maximum stress)÷2) was defined as the fatigue strength.

The fatigue test was conducted under conditions such that the average stress becomes ±10 MPa in each step, the stress conditions in which two specimens or more in three specimens were not fractured by two million repetitions were determined, and the average strength at that time was defined as the fatigue strength.

Test Conditions

Test Method: Partially Pulsating Test

Stress Ratio: 0.05

Frequency: 20 Hz

Repetition: 2 million

Number of Specimens: 3 pieces in each stress

Evaluation Criteria of Fatigue Strength

Acceptable: 200 MPa or more of average stress

Unacceptable: less than 200 MPa of average stress

Analysis of Average Thickness of Internally Oxidized Layer and Precipitate in Internally Oxidized Layer The cross section of the produced non oriented electrical steel sheet was polished, the SEM micrograph was taken using the reflection electron composition image at a magnification of 1000-fold, and the area of approximately 100 μm or more in the planar direction in the steel sheet was observed regarding the front surface and the back surface of the steel sheet. According to the necessity, the cross section of the produced non oriented electrical steel sheet was observed by TEM.

The observation of the microstructure and the measurement of the hardness of the internally oxidized layer and the central area of the silicon steel sheet were conducted on the basis of the above method. For the thickness of the internally oxidized layer, the average was calculated using those of 20 locations. For the Vickers hardness, 10 indentations were formed by the measuring load of 0.03 gf ($2.94\times10^{-3}$ N) on each of the internally oxidized layer and the central area, the diagonal length of each indentation (diamond shape) was measured by SEM, and the average was calculated using those of 10 locations. According to the necessity, the hardness value measured by the nanoindentation method was converted to the Vickers hardness.

The chemical compositions of the produced silicon steel sheets are shown in Tables 1 and 2, and the production conditions and the evaluation results are shown in Tables 3 to 6. Herein, the chemical compositions of the silicon steel sheets were substantially the same as those of the molten steels. In the tables, the underlined value indicates out of the range of the present invention. Moreover, in the tables, "-" with respect to the chemical composition of silicon steel sheet indicates that no alloying element was intentionally added.

As shown in Tables 1 to 6, in the inventive examples of Nos. B1 to B26, the chemical composition of silicon steel sheet, the internally oxidized layer, and the central area of the steel sheet were favorably controlled, and thereby the magnetic characteristics and the fatigue strength were excellent for the non oriented electrical steel sheet. Specifically, in the inventive examples of Nos. B1 to B26, it was possible to obtain the non oriented electrical steel sheet excellent in the magnetic characteristics and the fatigue strength without adding the additional process to harden the surface.

On the other hand, as shown in Tables 2, 4, and 6, in the comparative examples of Nos. b1 to b14, at least one of the chemical composition of silicon steel sheet, the internally oxidized layer, and the central area of the steel sheet were not favorably controlled, and thereby at least one of the magnetic characteristics and the fatigue strength were not satisfied for the non oriented electrical steel sheet.

TABLE 1

| STEEL No. | CHEMICAL COMPOSITION OF SILICON STEEL SHEET (IN UNITS OF MASS %, BALANCE CONSISTING OF Fe AND IMPURITIES) C | Si | Mn | P | S | Al | N | Cu | Sn | Sb | REM | Ca | Mg |
|---|---|---|---|---|---|---|---|---|---|---|---|---|---|
| A1 | 0.0028 | 3.0 | 0.19 | 0.02 | 0.0015 | 0.30 | 0.0025 | — | — | — | — | — | — |
| A2 | 0.0022 | 2.1 | 0.59 | 0.04 | 0.0014 | 1.15 | 0.0022 | — | — | — | — | — | — |
| A3 | 0.0021 | 3.9 | 0.21 | 0.03 | 0.0013 | 0.20 | 0.0023 | — | — | — | — | — | — |
| A4 | 0.0023 | 3.0 | 0.11 | 0.02 | 0.0013 | 0.32 | 0.0025 | — | — | — | — | — | — |
| A5 | 0.0022 | 2.2 | 1.95 | 0.01 | 0.0010 | 0.16 | 0.0020 | — | — | — | — | — | — |
| A6 | 0.0021 | 3.0 | 0.18 | 0.04 | 0.0012 | 0.30 | 0.0021 | — | — | — | — | — | — |
| A7 | 0.0022 | 3.0 | 0.22 | 0.02 | 0.0050 | 0.30 | 0.0023 | — | — | — | — | — | — |
| A8 | 0.0023 | 3.0 | 0.21 | 0.02 | 0.0012 | 0.12 | 0.0023 | — | — | — | — | — | — |
| A9 | 0.0018 | 2.2 | 0.22 | 0.03 | 0.0012 | 2.95 | 0.0021 | — | — | — | — | — | — |
| A10 | 0.0021 | 3.0 | 0.21 | 0.02 | 0.0014 | 0.30 | 0.0048 | — | — | — | — | — | — |
| A11 | 0.0024 | 3.0 | 0.20 | 0.02 | 0.0012 | 0.31 | 0.0022 | 0.20 | — | — | — | — | — |
| A12 | 0.0023 | 3.0 | 0.19 | 0.02 | 0.0010 | 0.29 | 0.0021 | — | 0.05 | — | — | — | — |
| A13 | 0.0021 | 3.0 | 0.21 | 0.02 | 0.0011 | 0.29 | 0.0021 | — | — | 0.03 | — | — | — |
| A14 | 0.0021 | 3.0 | 0.21 | 0.02 | 0.0025 | 0.31 | 0.0023 | — | — | — | 0.0050 | — | — |
| A15 | 0.0023 | 3.0 | 0.20 | 0.03 | 0.0026 | 0.30 | 0.0020 | — | — | — | — | 0.0040 | — |
| A16 | 0.0020 | 3.0 | 0.20 | 0.03 | 0.0026 | 0.28 | 0.0018 | — | — | — | — | — | 0.0030 |
| A17 | 0.0016 | 3.0 | 0.31 | 0.01 | 0.0008 | 0.29 | 0.0013 | — | — | 0.03 | — | 0.0015 | — |
| A18 | 0.0015 | 3.0 | 0.29 | 0.01 | 0.0009 | 0.31 | 0.0011 | — | 0.03 | — | 0.003 | — | — |
| A19 | 0.0026 | 2.7 | 0.20 | 0.04 | 0.0018 | 0.28 | 0.0020 | — | — | — | — | — | — |
| A20 | 0.0019 | 2.1 | 0.19 | 0.02 | 0.0010 | 0.33 | 0.0023 | 0.50 | 0.30 | — | — | — | — |

TABLE 2

| STEEL No. | CHEMICAL COMPOSITION OF SILICON STEEL SHEET (IN UNITS OF MASS %, BALANCE CONSISTING OF Fe AND IMPURITIES) C | Si | Mn | P | S | Al | N | Cu | Sn | Sb | REM | Ca | Mg |
|---|---|---|---|---|---|---|---|---|---|---|---|---|---|
| A21 | 0.0010 | 3.0 | 0.20 | 0.01 | 0.0015 | 0.29 | 0.0020 | — | — | — | — | — | — |
| A22 | 0.0021 | 3.0 | 0.19 | 0.01 | 0.0015 | 0.29 | 0.0019 | 0.10 | — | — | — | — | — |
| A23 | 0.0024 | 3.0 | 0.21 | 0.02 | 0.0012 | 0.31 | 0.0018 | — | 0.02 | — | — | — | — |
| A24 | 0.0023 | 3.0 | 0.20 | 0.01 | 0.0014 | 0.28 | 0.0020 | — | — | 0.02 | — | — | — |
| A25 | 0.0021 | 3.0 | 0.19 | 0.02 | 0.0044 | 0.31 | 0.0022 | — | — | — | — | — | — |
| A26 | 0.0023 | 3.0 | 0.21 | 0.03 | 0.0046 | 0.28 | 0.0019 | — | — | — | — | — | — |
| a1 | 0.0035 | 2.5 | 0.19 | 0.02 | 0.0016 | 0.30 | 0.0021 | — | — | — | — | — | — |
| a2 | 0.0022 | 1.8 | 0.18 | 0.02 | 0.0015 | 1.50 | 0.0023 | — | — | — | — | — | — |
| a3 | 0.0021 | 4.3 | 0.21 | 0.02 | 0.0015 | 0.20 | 0.0022 | — | — | — | — | — | — |
| a4 | 0.0023 | 2.5 | 0.08 | 0.01 | 0.0015 | 0.40 | 0.0021 | — | — | — | — | — | — |
| a5 | 0.0018 | 3.1 | 2.20 | 0.01 | 0.0017 | 0.21 | 0.0016 | — | — | — | — | — | — |
| a6 | 0.0022 | 3.0 | 0.19 | 0.07 | 0.0012 | 0.31 | 0.0019 | — | — | — | — | — | — |
| a7 | 0.0023 | 3.0 | 0.35 | 0.02 | 0.0060 | 0.18 | 0.0018 | — | — | — | — | — | — |
| a8 | 0.0025 | 3.0 | 0.50 | 0.02 | 0.0015 | 0.08 | 0.0020 | — | — | — | — | — | — |
| a9 | 0.0024 | 2.3 | 0.20 | 0.02 | 0.0015 | 3.10 | 0.0020 | — | — | — | — | — | — |
| a10 | 0.0020 | 3.1 | 0.21 | 0.02 | 0.0014 | 0.20 | 0.0056 | — | — | — | — | — | — |
| a11 | 0.0024 | 2.4 | 0.17 | 0.02 | 0.0015 | 0.31 | 0.0023 | — | — | — | — | — | — |
| a12 | 0.0026 | 3.0 | 0.19 | 0.03 | 0.0017 | 0.29 | 0.0019 | — | — | — | — | — | — |
| a13 | 0.0025 | 2.9 | 0.20 | 0.02 | 0.0020 | 0.30 | 0.0020 | — | — | — | — | — | — |
| a14 | 0.0023 | 2.9 | 0.20 | 0.02 | 0.0020 | 0.30 | 0.0020 | — | — | — | — | — | — |

TABLE 3

| | | HEAT CONSERVATION TREATMENT | | | |
|---|---|---|---|---|---|
| TEST No. | STEEL No. | HEAT CONSERVATION | TEMPERATURE ° C. | TIME MINUTES | PICKLING TREATMENT ADDITIVES |
| B1 | A1 | HEAT CONSERVATION | 850 | 10 | POLYAMINE + FORMIC ACID |
| B2 | A2 | HEAT CONSERVATION | 750 | 10 | POLYAMINE + FORMIC ACID |
| B3 | A3 | HEAT CONSERVATION | 700 | 10 | POLYAMINE + FORMIC ACID |
| B4 | A4 | HEAT CONSERVATION | 750 | 10 | POLYAMINE + FORMIC ACID |
| B5 | A5 | HEAT CONSERVATION | 770 | 10 | POLYAMINE + FORMIC ACID |
| B6 | A6 | HEAT CONSERVATION | 850 | 10 | POLYAMINE + FORMIC ACID |
| B7 | A7 | HEAT CONSERVATION | 800 | 10 | POLYAMINE + FORMIC ACID |
| B8 | A8 | HEAT CONSERVATION | 750 | 10 | POLYAMINE + FORMIC ACID |
| B9 | A9 | HEAT CONSERVATION | 700 | 10 | POLYAMINE + FORMIC ACID |
| B10 | A10 | HEAT CONSERVATION | 750 | 10 | POLYAMINE + FORMIC ACID |
| B11 | A11 | HEAT CONSERVATION | 700 | 10 | POLYAMINE + FORMIC ACID |
| B12 | A12 | HEAT CONSERVATION | 730 | 10 | POLYAMINE + FORMIC ACID |
| B13 | A13 | HEAT CONSERVATION | 750 | 10 | POLYAMINE + FORMIC ACID |
| B14 | A14 | HEAT CONSERVATION | 730 | 10 | POLYAMINE + FORMIC ACID |
| B15 | A15 | HEAT CONSERVATION | 700 | 10 | POLYAMINE + FORMIC ACID |
| B16 | A16 | HEAT CONSERVATION | 700 | 10 | POLYAMINE + FORMIC ACID |
| B17 | A17 | HEAT CONSERVATION | 700 | 10 | POLYAMINE + FORMIC ACID |
| B18 | A18 | HEAT CONSERVATION | 700 | 10 | POLYAMINE + FORMIC ACID |
| B19 | A19 | HEAT CONSERVATION | 850 | 170 | SODIUM THIOSULFATE |
| B20 | A20 | HEAT CONSERVATION | 700 | 10 | POLYAMINE + FORMIC ACID |

TABLE 4

| | | HEAT CONSERVATION TREATMENT | | | |
|---|---|---|---|---|---|
| TEST No. | STEEL No. | HEAT CONSERVATION | TEMPERATURE ° C. | TIME MINUTES | PICKLING TREATMENT ADDITIVES |
| B21 | A21 | HEAT CONSERVATION | 700 | 10 | POLYAMINE + FORMIC ACID |
| B22 | A22 | HEAT CONSERVATION | 830 | 10 | POLYAMINE + FORMIC ACID |
| B23 | A23 | HEAT CONSERVATION | 830 | 10 | POLYAMINE + FORMIC ACID |
| B24 | A24 | HEAT CONSERVATION | 830 | 10 | POLYAMINE + FORMIC ACID |
| B25 | A25 | HEAT CONSERVATION | 800 | 20 | POLYAMINE + FORMIC ACID |
| B26 | A26 | HEAT CONSERVATION | 800 | 30 | POLYAMINE + FORMIC ACID |
| b1 | a1 | HOT ROLLED STEEL SHEET ANNEALING | 800 | 1 | POLYAMINE + FORMIC ACID |
| b2 | a2 | HEAT CONSERVATION | 750 | 10 | POLYAMINE + FORMIC ACID |
| b3 | a3 | HEAT CONSERVATION | 680 | 10 | POLYAMINE + FORMIC ACID |
| b4 | a4 | HEAT CONSERVATION | 650 | 10 | POLYAMINE + FORMIC ACID |
| b5 | a5 | HEAT CONSERVATION | 800 | 10 | POLYAMINE + FORMIC ACID |
| b6 | a6 | HEAT CONSERVATION | 850 | 10 | POLYAMINE + FORMIC ACID |
| b7 | a7 | HEAT CONSERVATION | 800 | 10 | POLYAMINE + FORMIC ACID |
| b8 | a8 | HEAT CONSERVATION | 750 | 10 | POLYAMINE + FORMIC ACID |
| b9 | a9 | HEAT CONSERVATION | 700 | 10 | POLYAMINE + FORMIC ACID |
| b10 | a10 | HEAT CONSERVATION | 750 | 10 | SODIUM THIOSULFATE |
| b11 | a11 | HEAT CONSERVATION | 690 | 10 | POLYAMINE + FORMIC ACID |
| b12 | a12 | HEAT CONSERVATION | 860 | 10 | POLYAMINE + FORMIC ACID |
| b13 | a13 | HOT ROLLED STEEL SHEET ANNEALING | 800 | 1 | POLYAMINE + FORMIC ACID |
| b14 | a14 | HEAT CONSERVATION | 720 | 8 | POLYAMINE + FORMIC ACID |

TABLE 5

| | | INTERNALLY OXIDIZED LAYER | | VICKERS HARDNESS | | |
|---|---|---|---|---|---|---|
| TEST No. | STEEL No. | AVERAGE THICKNESS μm | EXISTENCE OF $SiO_2$ | INTERNALLY OXIDIZED LAYER Hv | CENTRAL AREA Hv | RATIO OF HARDNESS |
| B1 | A1 | 0.15 | EXIST | 200 | 170 | 1.18 |
| B2 | A2 | 0.6 | EXIST | 190 | 150 | 1.27 |
| B3 | A3 | 0.4 | EXIST | 250 | 215 | 1.16 |
| B4 | A4 | 0.8 | EXIST | 205 | 170 | 1.21 |
| B5 | A5 | 2.0 | EXIST | 180 | 140 | 1.29 |
| B6 | A6 | 4.8 | EXIST | 200 | 170 | 1.18 |
| B7 | A7 | 2.0 | EXIST | 210 | 170 | 1.24 |
| B8 | A8 | 0.6 | EXIST | 210 | 175 | 1.20 |
| B9 | A9 | 0.5 | EXIST | 235 | 195 | 1.21 |
| B10 | A10 | 1.0 | EXIST | 210 | 170 | 1.24 |
| B11 | A11 | 0.5 | EXIST | 210 | 170 | 1.24 |
| B12 | A12 | 1.0 | EXIST | 220 | 175 | 1.26 |
| B13 | A13 | 2.0 | EXIST | 225 | 170 | 1.32 |

TABLE 5-continued

| | | | | | | |
|---|---|---|---|---|---|---|
| B14 | A14 | 1.2 | EXIST | 215 | 170 | 1.26 |
| B15 | A15 | 0.6 | EXIST | 210 | 170 | 1.24 |
| B16 | A16 | 0.8 | EXIST | 215 | 175 | 1.23 |
| B17 | A17 | 0.5 | EXIST | 210 | 170 | 1.24 |
| B18 | A18 | 0.5 | EXIST | 215 | 175 | 1.23 |
| B19 | A19 | 0.6 | EXIST | 200 | 170 | 1.18 |
| B20 | A20 | 0.3 | EXIST | 141 | 122 | 1.16 |

| TEST No. | MAGNETIC FLUX DENSITY $B_{50}$ T | IRON LOSS $W_{15/50}$ W/kg | FATIGUE STRENGTH MPa | NOTE |
|---|---|---|---|---|
| B1 | 1.71 | 2.5 | 210 | INVENTIVE EXAMPLE |
| B2 | 1.70 | 2.3 | 200 | INVENTIVE EXAMPLE |
| B3 | 1.69 | 2.2 | 220 | INVENTIVE EXAMPLE |
| B4 | 1.71 | 2.2 | 210 | INVENTIVE EXAMPLE |
| B5 | 1.71 | 2.2 | 200 | INVENTIVE EXAMPLE |
| B6 | 1.69 | 2.5 | 200 | INVENTIVE EXAMPLE |
| B7 | 1.71 | 2.5 | 210 | INVENTIVE EXAMPLE |
| B8 | 1.68 | 2.4 | 210 | INVENTIVE EXAMPLE |
| B9 | 1.65 | 2.4 | 230 | INVENTIVE EXAMPLE |
| B10 | 1.71 | 2.5 | 210 | INVENTIVE EXAMPLE |
| B11 | 1.72 | 2.1 | 210 | INVENTIVE EXAMPLE |
| B12 | 1.72 | 2.0 | 210 | INVENTIVE EXAMPLE |
| B13 | 1.72 | 2.1 | 220 | INVENTIVE EXAMPLE |
| B14 | 1.72 | 1.9 | 220 | INVENTIVE EXAMPLE |
| B15 | 1.72 | 1.9 | 210 | INVENTIVE EXAMPLE |
| B16 | 1.72 | 1.9 | 210 | INVENTIVE EXAMPLE |
| B17 | 1.73 | 1.8 | 210 | INVENTIVE EXAMPLE |
| B18 | 1.73 | 1.8 | 210 | INVENTIVE EXAMPLE |
| B19 | 1.73 | 1.8 | 230 | INVENTIVE EXAMPLE |
| B20 | 1.71 | 1.9 | 200 | INVENTIVE EXAMPLE |

TABLE 6

| | | INTERNALLY OXIDIZED LAYER | | VICKERS HARDNESS | | |
|---|---|---|---|---|---|---|
| TEST No. | STEEL No. | AVERAGE THICKNESS μm | EXISTENCE OF $SiO_2$ | INTERNALLY OXIDIZED LAYER Hv | CENTRAL AREA Hv | RATIO OF HARDNESS |
| B21 | A21 | 0.3 | EXIST | 210 | 150 | 1.40 |
| B22 | A22 | 0.8 | EXIST | 220 | 170 | 1.29 |
| B23 | A23 | 1.2 | EXIST | 230 | 175 | 1.31 |
| B24 | A24 | 2.2 | EXIST | 235 | 170 | 1.38 |
| B25 | A25 | 2.2 | EXIST | 220 | 170 | 1.29 |
| B26 | A26 | 2.5 | EXIST | 235 | 175 | 1.34 |
| b1 | a1 | 0.2 | EXIST | 145 | 140 | 1.04 |
| b2 | a2 | 0.2 | EXIST | 130 | 118 | 1.10 |
| b3 | a3 | 2.0 | EXIST | 300 | 245 | 1.22 |
| b4 | a4 | 0.08 | EXIST | 150 | 130 | 1.15 |
| b5 | a5 | 5.3 | EXIST | 215 | 185 | 1.16 |
| b6 | a6 | 1.2 | EXIST | 210 | 175 | 1.20 |
| b7 | a7 | 1.8 | EXIST | 205 | 165 | 1.24 |
| b8 | a8 | 3.3 | EXIST | 200 | 170 | 1.18 |
| b9 | a9 | 2.5 | EXIST | 235 | 200 | 1.18 |
| b10 | a10 | 0 | NONE | 190 | 165 | 1.15 |
| b11 | a11 | 0.6 | EXIST | 130 | 125 | 1.04 |
| b12 | a12 | 5.8 | EXIST | 200 | 154 | 1.30 |
| b13 | a13 | 0.5 | EXIST | 155 | 150 | 1.03 |
| b14 | a14 | 0.6 | EXIST | 150 | 145 | 1.03 |

| TEST No. | MAGNETIC FLUX DENSITY $B_{50}$ T | IRON LOSS $W_{15/50}$ W/kg | FATIGUE STRENGTH MPa | NOTE |
|---|---|---|---|---|
| B21 | 1.72 | 1.8 | 210 | INVENTIVE EXAMPLE |
| B22 | 1.74 | 1.9 | 220 | INVENTIVE EXAMPLE |
| B23 | 1.74 | 1.8 | 220 | INVENTIVE EXAMPLE |
| B24 | 1.74 | 1.9 | 230 | INVENTIVE EXAMPLE |
| B25 | 1.70 | 2.5 | 230 | INVENTIVE EXAMPLE |
| B26 | 1.71 | 2.4 | 240 | INVENTIVE EXAMPLE |
| b1 | 1.64 | 3.1 | 150 | COMPARATIVE EXAMPLE |

TABLE 6-continued

| | | | | |
|---|---|---|---|---|
| b2 | 1.68 | 3.1 | 150 | COMPARATIVE EXAMPLE |
| b3 | 1.59 | 3.4 | 240 | COMPARATIVE EXAMPLE |
| b4 | 1.65 | 3.2 | 150 | COMPARATIVE EXAMPLE |
| b5 | 1.63 | 3.2 | 230 | COMPARATIVE EXAMPLE |
| b6 | 1.71 | 2.5 | 150 | COMPARATIVE EXAMPLE |
| b7 | 1.71 | 3.2 | 210 | COMPARATIVE EXAMPLE |
| b8 | 1.65 | 3.1 | 210 | COMPARATIVE EXAMPLE |
| b9 | 1.59 | 3.4 | 190 | COMPARATIVE EXAMPLE |
| b10 | 1.71 | 3.1 | 150 | COMPARATIVE EXAMPLE |
| b11 | 1.71 | 2.6 | 150 | COMPARATIVE EXAMPLE |
| b12 | 1.72 | 2.4 | 170 | COMPARATIVE EXAMPLE |
| b13 | 1.69 | 2.5 | 150 | COMPARATIVE EXAMPLE |
| b14 | 1.68 | 2.7 | 160 | COMPARATIVE EXAMPLE |

INDUSTRIAL APPLICABILITY

According to the above aspects of the present invention, it is possible to provide the non oriented electrical steel sheet excellent in the fatigue strength and the magnetic characteristics and also excellent in cost. Therefore, it is possible to provide the non oriented electrical steel sheet which is suitable as the core materials for electrical equipment, especially suitable as the core materials for rotating machines, small and medium size transformers, electrical components, and the like, and especially suitable as the rotor core of IPM motor. In addition, it is possible to provide the non oriented electrical steel sheet which sufficiently meets the demand for higher efficiency of electrical equipment, higher speed rotation of rotating machines, and smaller size of rotating machines. Accordingly, the present invention has significant industrial applicability.

REFERENCE SIGNS LIST

1 NON ORIENTED ELECTRICAL STEEL SHEET
11 SILICON STEEL SHEET (BASE STEEL SHEET)
13 INTERNALLY OXIDIZED LAYER
131 $SiO_2$
15 INSULATION COATING
17 EXTERNALLY OXIDIZED LAYER
L ROLLING DIRECTION

What is claimed is:

1. A non oriented electrical steel sheet comprising a silicon steel sheet and an insulation coating, characterized in that the silicon steel sheet consists of, as a chemical composition, by mass %,
more than 2.00 to 4.00% of Si,
0.10 to 3.00% of Al,
0.10 to 2.00% of Mn,
0.0030% or less of C,
0.050% or less of P,
0.005% or less of S,
0.005% or less of N,
0 to 0.40% of Sn,
0 to 1.00% of Cu,
0 to 0.40% of Sb,
0 to 0.0400% of REM,
0 to 0.0400% of Ca,
0 to 0.0400% of Mg, and
a balance consisting of Fe and impurities,
when viewing a cross section, whose cutting direction is parallel to a thickness direction, a central area is a thickness range of ⅝ to ⅜ of the silicon steel sheet, a Vickers hardness in the central area is 120 to 300 HV, and
when viewing the cross section, the silicon steel sheet includes an internally oxidized layer in a surface of the silicon steel sheet, wherein the internally oxidized layer contains $SiO_2$, an average thickness of the internally oxidized layer is 0.10 to 5.0 μm, and a Vickers hardness in the internally oxidized layer is 1.15 to 1.5 times the Vickers hardness in the central area.

2. The non oriented electrical steel sheet according to claim 1,
wherein the silicon steel sheet contains, as the chemical composition, by mass %, at least one selected from a group of
0.02 to 0.40% of Sn,
0.10 to 1.00% of Cu, and
0.02 to 0.40% of Sb.

3. The non oriented electrical steel sheet according to claim 1,
wherein the silicon steel sheet contains, as the chemical composition, by mass %, at least one selected from a group of
0.0005 to 0.0400% of REM,
0.0005 to 0.0400% of Ca, and
0.0005 to 0.0400% of Mg.

4. The non oriented electrical steel sheet according to claim 1,
wherein the Vickers hardness in the internally oxidized layer is 155 to 450 HV.

5. The non oriented electrical steel sheet according to claim 1,
wherein the average thickness of the internally oxidized layer is 0.55 to 5.0 μm.

6. A non oriented electrical steel sheet comprising a silicon steel sheet and an insulation coating, characterized in that the silicon steel sheet contains, as a chemical composition, by mass %,
more than 2.00 to 4.00% of Si,
0.10 to 3.00% of Al,
0.10 to 2.00% of Mn,
0.0030% or less of C,
0.050% or less of P,
0.005% or less of S,
0.005% or less of N,
0 to 0.40% of Sn,
0 to 1.00% of Cu,
0 to 0.40% of Sb,
0 to 0.0400% of REM,
0 to 0.0400% of Ca,
0 to 0.0400% of Mg, and
a balance comprising Fe and impurities,
when viewing a cross section, whose cutting direction is parallel to a thickness direction, a central area is a thickness range of 5/8 to 3/8 of the silicon steel sheet, a Vickers hardness in the central area is 120 to 300 HV, and when viewing the cross section, the silicon steel sheet includes an internally oxidized layer in a surface of the silicon steel sheet, wherein the internally oxidized layer contains $SiO_2$, an average thickness of the internally oxidized layer is 0.10 to 5.0 μm, and a Vickers hardness in the internally oxidized layer is 1.15 to 1.5 times the Vickers hardness in the central area.

* * * * *